March 22, 1932. E. H. BRADLEY 1,850,739
LIQUID DISPENSING APPARATUS
Filed April 25, 1929   2 Sheets-Sheet 2
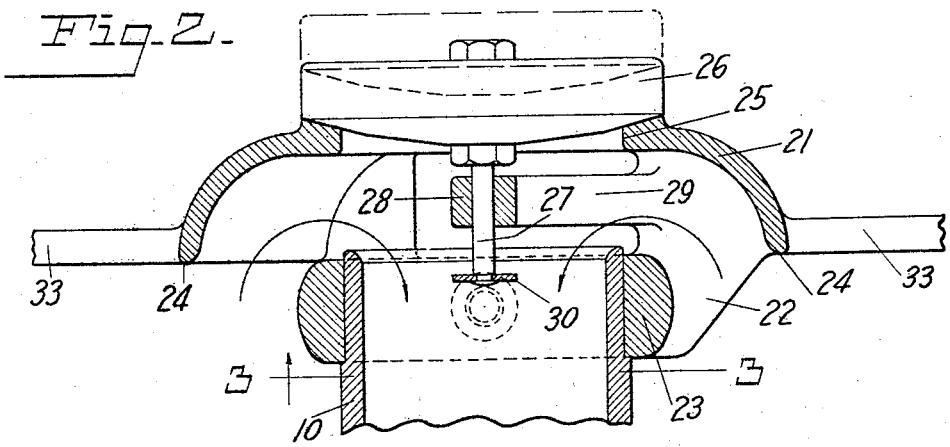
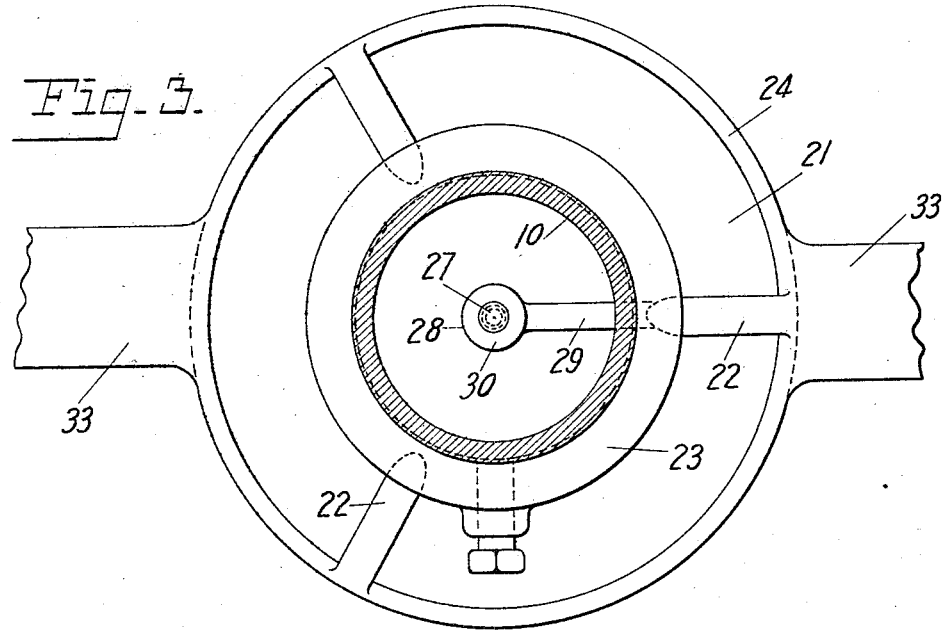
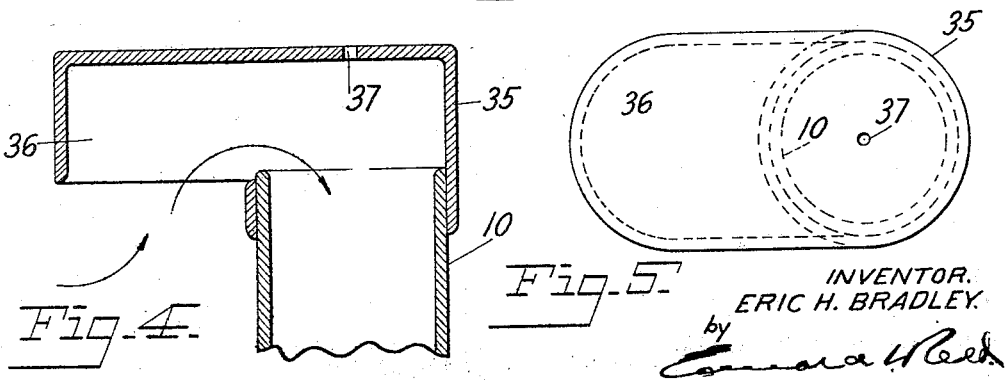
INVENTOR.
ERIC H. BRADLEY.
his ATTORNEY.

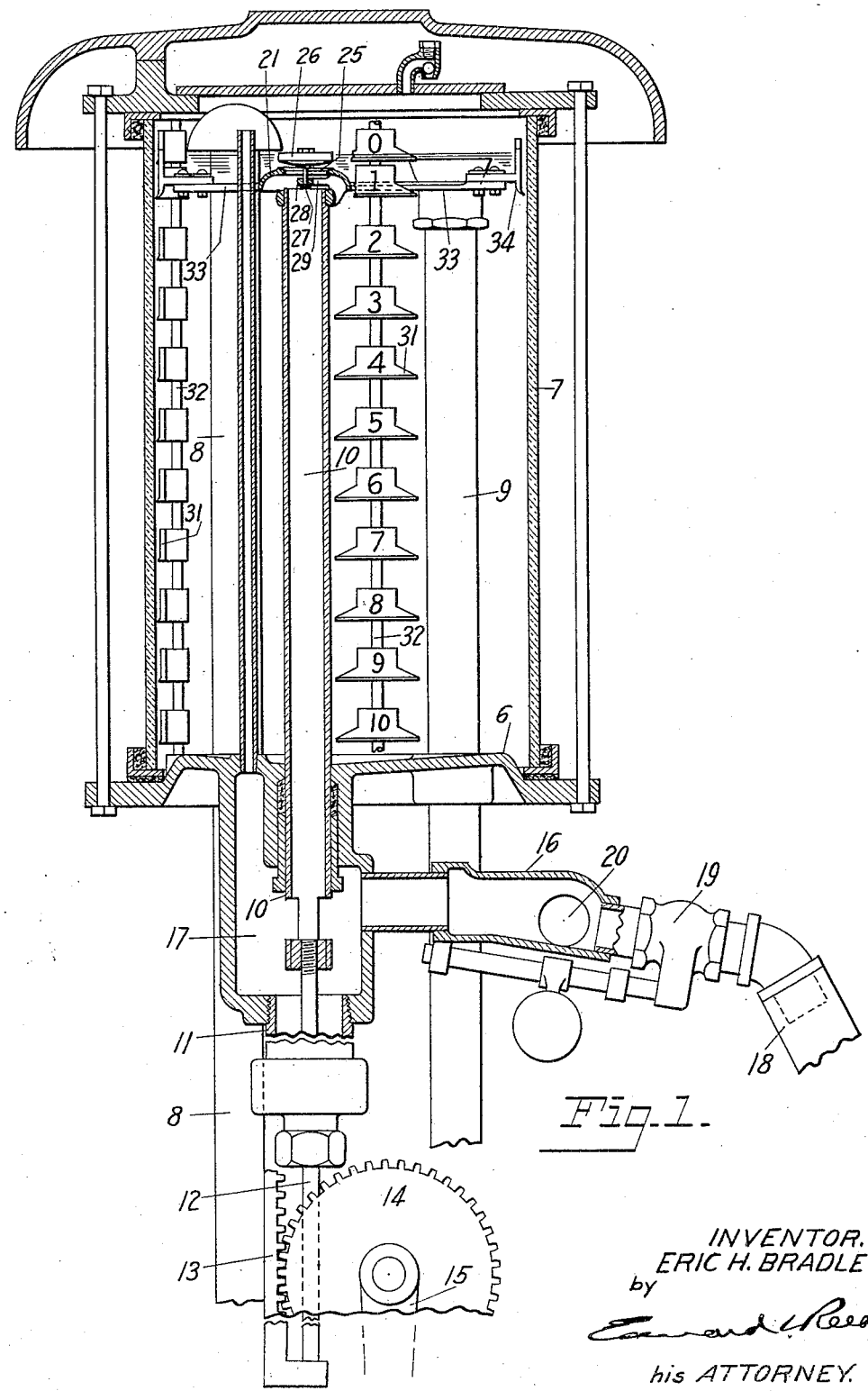

Patented Mar. 22, 1932

1,850,739

UNITED STATES PATENT OFFICE

ERIC HEYWOOD BRADLEY, OF DAYTON, OHIO, ASSIGNOR TO NATIONAL PUMPS CORPORATION, OF DAYTON, OHIO, A CORPORATION OF OHIO

LIQUID DISPENSING APPARATUS

Application filed April 25, 1929. Serial No. 357,925.

This invention relates to liquid dispensing apparatus and more particularly to means for expediting the delivery of the final portion of a measured quantity of liquid from the measuring receptacle. In that type of dispensing apparatus commonly known as a visible gasoline pump the gasoline is discharged from the receptacle through a discharge pipe and the flow of the gasoline into the discharge pipe is retarded by its contact with the edge of the pipe and as the level of the gasoline in the receptacle approaches the top of the discharge pipe the adhesion or frictional resistance offered to the flow of the gasoline will so retard the flow that the gasoline entering the pipe will be less than the capacity of the pipe, thereby causing a break at the sight glass in the delivery line, that is, causing the level of the gasoline in the delivery line to drop below the top of the sight opening. After this break at the sight opening the gasoline will continue to enter or dribble into the discharge pipe until the level of the gasoline has reached approximately the level of the upper end of the discharge pipe but this requires an appreciable interval of time and the complete delivery of the measured quantity of gasoline is correspondingly delayed. Regulations covering the use of gasoline pumps of this type require that the delivery of the gasoline shall be completed within a very brief interval, ten seconds, after the break at the sight opening, and in the usual construction the retardation of the flow of the final portion of the measured quantity of gasoline into the discharge pipe is such that the delivery cannot be completed within the limit fixed.

One object of the present invention is to provide in a dispensing apparatus of this kind means for expediting the entrance of the final portion of the measured quantity of gasoline into the discharge line and to thus enable the delivery to be quickly completed after the break at the sight opening.

A further object of the invention is to provide the discharge pipe with means for siphoning the gasoline from the receptacle into the pipe.

A further object of the invention is to provide such a device with means for quickly releasing the air from the discharge pipe when the gasoline first enters the same.

Other objects of the invention will appear as the apparatus is described in detail.

In the accompanying drawings Fig. 1 is a vertical sectional view taken through the delivery receptacle of a dispensing apparatus equipped with my invention; Fig. 2 is a vertical sectional view taken centrally through the upper portion of the discharge pipe and the siphon; Fig. 3 is a transverse sectional view taken on the line 3—3 of Fig. 2, looking in the direction of the arrows; Fig. 4 is a sectional view of a modified form of the invention; and Fig. 5 is a plan view of the device of Fig. 4.

In these drawings I have illustrated one embodiment of my invention, together with a modification thereof, and have shown the same in connection with the delivery receptacle of a gasoline pump of the visible type but it will be understood that the invention itself may take various forms and that it may be used in connection with dispensing apparatus of various kinds.

The dispensing apparatus here shown comprises a visible delivery bowl 6 having a transparent circumferential wall 7. This delivery receptacle or bowl is mounted in an elevated position and is provided with the usual supply pipe 8, leading from a pump or other source of supply, a vent pipe 38 and an overflow pipe 9 arranged to drain back to the storage receptacle all gasoline delivered to the delivery bowl in excess of the measuring capacity of that bowl. Slidably mounted in the base of the delivery receptacle is a vertically adjustable discharge pipe 10 which is adjusted to a position determined by the amount of gasoline to be delivered. As here shown, the discharge pipe extends through the base of the delivery receptacle into an elongated chamber or well 11 and has connected therewith an actuating rod 12 extending below the well and connected with a toothed rack 13 which meshes with a pinion 14 to which is connected a crank 15 by means of which the discharge pipe is adjusted. The lower end of the discharge pipe is in open communication with the well and the well is connected with a delivery line which is here shown as comprising a pipe 16 extending laterally from an enlarged chamber 17 at the upper end of the well and having connected with its outer end the usual flexible hose 18. A valve 19 in the delivery line controls the flow of gasoline both through the delivery line and the discharge pipe. The delivery pipe 16 is provided between the valve 19 and the chamber 17 with a sight opening 20 so arranged that when the discharge pipe is full of gasoline the level of the gasoline in the delivery pipe will be above the sight opening. When the full measured quantity of gasoline has been delivered and the gasoline in the well and discharge pipe has dropped to its lowest level then the level of the gasoline in the delivery pipe will be below the sight opening or near the bottom thereof, depending upon the arrangement of the sight opening in the particular installation. When the final portion of a measured quantity of gasoline is flowing slowly or dribbling into the discharge pipe the gasoline will escape from the delivery pipe more rapidly than it enters the same, thus causing the level of the liquid in the delivery pipe to fall below the top of the sight opening and producing what is commonly known as a "break." So long as gasoline continues to enter the discharge pipe the level of the liquid in the delivery pipe will be above the bottom of the sight opening and it will be apparent that the delivery has not been completed.

As has been above explained, it usually requires an appreciable period of time to complete the delivery of the measured quantity of gasoline after the break at the sight opening. In order to expedite the completion of the delivery after the break at the sight opening I have provided means for causing the final portion of the measured quantity of gasoline to quickly enter the discharge pipe, thus avoiding the dribbling or slow flow of the gasoline during the latter stages of the delivery. To accomplish this I have provided at the intake end of the discharge pipe a device which will act as a siphon and will siphon the liquid from the receptacle or bowl into the discharge pipe down to a level in or slightly below the plane of the upper end of the discharge pipe. This siphoning device may take various forms but it preferably comprises a hollow structure mounted on the upper end of the discharge pipe and having its lower portion extending laterally from the pipe and provided with an inlet opening arranged at or slightly below the plane of the top of the pipe. As shown in Figs. 1 to 3 the structure is in the form of an inverted dish and has the general shape of a dome, as shown at 21. This structure is carried by brackets 22 rigidly secured to a collar 23 mounted on and rigidly secured to the upper end portion of the discharge pipe 10. The brackets and collar 23 are so arranged that the lower circumferential edge 24 of this structure will be adjacent to the plane of the upper end of the discharge pipe. Preferably this edge is slightly below that plane but this is not essential. The upper portion of the structure 21 is provided with an opening 25 directly above the discharge pipe and this opening is controlled by a float controlled valve 26. In the present instance the float itself contacts with the structure 21 about the opening and constitutes the valve, the valve and its seat having inclined surfaces to facilitate the flow of air about the valve. It is here shown as guided in its movement by a stem 27 slidably mounted in a bearing 28 in the central portion of a spider 29 carried by the structure 21. A stop 30 on the stem limits the upward movement of the valve.

When the discharge pipe is in its uppermost position, that is, when the upper end of the pipe is at the maximum level of the liquid in the receptacle the float 26 will move by gravity into contact with the structure 21 and close the opening therethrough. As the pipe is lowered to its adjusted position, to deliver a measured quantity of gasoline, the structure 21 and float 26 will be submerged in the gasoline and the float will rise and gasoline will enter the discharge pipe through the opening 25 and the air which was contained within the discharge pipe will quickly escape through the opening 25. As the level of the gasoline approaches the top of the structure 21 the flow of gasoline through the opening 25 and about the valve will quickly create a suction which will drag the valve downwardly into contact with its seat. As long as there is sufficient gasoline above the structure to float the valve the opening through the top of the structure will remain open but before the gasoline level reaches the top of the structure the valve will be seated, thereby closing the opening and causing the gasoline to enter the discharge pipe wholly through the passageway formed between the dome-shaped portion of the structure and the end of the pipe. The inlet to this passageway being at or below the upper end of the pipe a siphon action will be set up and as the level of the liquid in the receptacle approaches the plane of the upper end of the discharge pipe the liquid will be siphoned from the receptacle into the discharge pipe until the level of the liquid is below the edge of the siphoning structure which, as has been explained, is at or below the level of the top of the pipe. Consequently all the gasoline which can enter the discharge pipe will enter the same quickly and will be in the discharge pipe before there is any break at the sight opening. This siphon action accelerates the downward flow of the gasoline through the discharge pipe and tends to keep the pipe full until the measured quantity of gasoline has entered the pipe. It retards the break until the flow of gasoline from the bowl to the pipe has been completed and thus establishes a non-dribbing level of gasoline substantially at the top of the pipe but preferably slightly below the upper edge thereof.

Suitable markers are provided to indicate to the operator and to the customer the position to which the discharge pipe is adjusted and, in the present instance, I have provided about the inner side of the transparent wall 7 of the delivery receptacle a plurality of series of fixed indicators or pointers 31, marked in gallons, and, as here shown, mounted on rods 32 extending through the receptacle. Cooperating with these fixed pointers are other indicators or pointers which travel with the discharge pipe and which are preferably carried by that pipe. In the present instance, the siphon structure 21 is provided with laterally extending arms 33 to the outer ends of which indicators or pointers 34 are rigidly secured and on which the pointers are supported in such a position that they will travel alongside the pointers 31, close to the wall of the receptacle.

The siphon structure may take various forms and in Figs. 4 and 5 I have illustrated a very simple form of siphon which is efficient in operation. As there shown, the siphon 35 is in the form of an elbow rigidly secured to the top of the discharge pipe 10 and having a laterally extending portion 36, the side walls of which extend downwardly to or slightly below the plane of the top of the discharge pipe, thus providing the structure with an intake opening in the bottom thereof at or below the plane of the upper edge of the discharge pipe. The top wall of the structure is vented, by one or more small holes, 37, which will permit of the escape of the air from the discharge pipe, but the vent is so small that it will not interfere with or break the siphon action. With this type of device the siphoning action is substantially the same as that above set forth but the air from the discharge pipe escapes more slowly. Obviously the siphon structure may be of any suitable form. For example, it may be dome-shaped, as shown in Fig. 2, and the small vent substituted for the large valve controlled opening.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a liquid dispensing apparatus comprising a delivery receptacle and a vertically adjustable discharge pipe extending into said receptacle and having it upper end open, a structure carried by said discharge pipe and having a passageway communicating therewith, the intake end of said passageway being adjacent to the plane of the upper end of said discharge pipe, said structure having an opening therein to permit the escape of air from said discharge pipe when liquid first enters the same.

2. In a liquid dispensing apparatus comprising a delivery receptacle and a vertically adjustable discharge pipe extending into said receptacle and having its upper end open, a structure mounted on said discharge pipe, extending about the upper end thereof and having a part extending laterally from said discharge pipe and provided with an opening in the bottom thereof adjacent to the plane of the upper end of said discharge line, said structure having an aperture above said discharge pipe, and a float controlled valve to open said aperture when said structure is submerged in the liquid in said receptacle.

3. In a liquid dispensing apparatus comprising a delivery receptacle and a vertically adjustable discharge pipe extending into said receptacle and having its upper end open, a structure mounted on said discharge pipe, extending about the upper end thereof and having a part extending laterally from said discharge pipe and provided with an opening in the bottom thereof adjacent to the plane of the upper end of said discharge pipe, said structure having a relatively large opening therein above said discharge pipe, and a float movable into and out of contact with said structure about the edge of said opening and constituting a valve to control said opening.

4. In a liquid dispensing apparatus comprising a delivery receptacle and a vertically adjustable discharge pipe extending into said receptacle and having its upper end open, an inverted dish-shaped structure mounted on said discharge pipe, spaced from the upper end thereof and having its lower edge in a plane adjacent to the plane of the upper end of said discharge pipe.

5. In a liquid dispensing apparatus comprising a delivery receptacle and a vertically adjustable discharge pipe extending into said receptacle and having its upper end open, an inverted dish-shaped structure mounted on said discharge pipe, spaced from the upper end thereof and having its lower edge in a plane adjacent to the plane of the upper end of said discharge pipe, said structure having an opening above said discharge pipe and a float controlled valve to control said opening.

6. In a liquid dispensing apparatus comprising a delivery receptacle and a vertically adjustable discharge pipe extending into said receptacle and having its upper end open, a collar mounted on said discharge pipe, and a dome-like structure carried by said collar and spaced from the upper end of said pipe, the lower circumferential edge of said structure being spaced radially from said pipe and supported in a plane near the upper end of said pipe.

7. In a liquid dispensing apparatus comprising a delivery receptacle and a vertically adjustable discharge pipe extending into said receptacle and having its upper end open, a dome-like structure carried by said discharge pipe, spaced from the upper end thereof, having its lower circumferential edge spaced radially from said pipe and arranged in a plane near the upper end of said pipe, and having an air vent in the top wall thereof.

8. In a liquid dispensing apparatus comprising a delivery receptacle and a vertically adjustable discharge pipe extending into said receptacle and having its upper end open, a hollow structure carried by said discharge pipe with its top wall above the same and having a laterally extending portion provided in its bottom with an inlet arranged adjacent to the plane of the upper edge of said discharge pipe, said hollow structure having an opening to permit the escape of air from said discharge pipe when liquid first enters the same.

9. In a liquid dispensing apparatus comprising a delivery receptacle and a vertically adjustable discharge pipe extending into said receptacle and having its upper end open, an inverted dish-shaped structure mounted on said discharge pipe, spaced from the upper end thereof and having its lower edge in a plane adjacent to the plane of the upper end of said discharge pipe, said structure having an opening therein to permit the escape of air from said discharge pipe when liquid first enters the same.

10. In a liquid dispensing apparatus comprising a delivery receptacle and a vertical discharge pipe extending into said receptacle and having its upper end open, a hollow structure mounted on said discharge pipe, overhanging the upper end thereof and having an opening in the bottom thereof and a vent in the upper portion thereof, the edge of said opening being arranged in a transverse plane adjacent to the upper end of said discharge pipe.

In testimony whereof, I affix my signature hereto.

ERIC HEYWOOD BRADLEY.